United States Patent [19]

Tuli

[11] Patent Number: 5,612,798
[45] Date of Patent: Mar. 18, 1997

[54] OPTICALLY ADDRESSED LIQUID CRYSTAL DISPLAY DEVICE HAVING A MATRIX ARRAY OF PHOTOCELLS

[76] Inventor: Raja S. Tuli, 55 City Centre Dr, Suite 500, Mississauga, Ontario, Canada, L5B1M3

[21] Appl. No.: 251,102

[22] Filed: May 31, 1994

[51] Int. Cl.⁶ .................................................. G02F 1/135
[52] U.S. Cl. ............................................. 349/24; 349/29
[58] Field of Search ........................................ 359/45, 72

[56] References Cited

U.S. PATENT DOCUMENTS

| | | | |
|---|---|---|---|
| 4,277,145 | 7/1981 | Hareng et al. | 359/45 |
| 4,842,376 | 6/1989 | Braatz et al. | 359/45 |
| 5,073,010 | 12/1991 | Johnson et al. | 359/72 |
| 5,177,628 | 1/1993 | Moddel | 359/72 |
| 5,353,080 | 10/1994 | Christman | 354/154 |

FOREIGN PATENT DOCUMENTS

| | | | |
|---|---|---|---|
| 62-242919 | 10/1987 | Japan | 359/45 |
| 63-214723 | 9/1988 | Japan | 359/45 |

*Primary Examiner*—William L. Sikes
*Assistant Examiner*—Charles Miller

[57] ABSTRACT

A display mechanism is featured which incorporates a scanning laser which is used to address a two dimensional photocell matrix array. This array is coupled directly to a liquid crystal display (LCD) and is used to address pixels on the LCD thus creating a display as addressed by the laser. The image created is on the far side of the scanning laser and remains on the LCD until the charge from the photocells dissipate. A new display is created once again as the scanning laser addresses and illuminates desired photocells. Additional illumination is provided at the front of the display on the same side as the observer, or at the rear on the same side as the laser.

6 Claims, 3 Drawing Sheets

5,612,798

OPTICALLY ADDRESSED LIQUID CRYSTAL DISPLAY DEVICE HAVING A MATRIX ARRAY OF PHOTOCELLS

BACKGROUND OF THE INVENTION

This invention relates to an apparatus and a method for producing a display mechanism utilizing a scanning laser which addresses pixels on the device. In particular, the apparatus employs a liquid crystal display panel which interfaces with a two dimensional photocell matrix array. These photocells are individually addressed by a scanning laser and when addressed, the photocells utilizing the energy given by the laser beam send a charge to the liquid crystal display panel thus activating a pixel on the display screen. By selectively addressing photocells in the matrix formation, the desired display is formed on the liquid crystal display panel. A single laser or multiple lasers can be used to scan the photocell array which is similar to the functioning of an electron gun in a Cathode Ray Tube (CRT) to form an image. Unlike applications that use laser beams to reflect off a display screen, this device is capable of brighter outputs as the laser beam is used only to activate the liquid crystal display and uses other brighter lights that can be used to illuminate the display screen.

Prior art would involve passive liquid crystal displays which require I.C. drivers to address each pixel. These drivers are placed around the display screen increasing the overall size and also making it difficult to place two or more screens adjacent to each other without a space between them. Active liquid crystal displays require a transistor at each pixel's location increasing the complexity and cost with a limited yield in production. The advantages of this device are that unlike prior art, addressing the device does not require active electronics and hence the display screen can be made quite large, in addition to which pixels can be located at the extreme edge, as no electronics are required there. This enables screens to be placed adjacent to each other in a matrix fashion to create extremely large displays utilizing a multitude of smaller screens, with continuity across screens as no gaps are present. Conventional CRT's require a vacuum in the tube increasing the cost of manufacturing, and when in operation, the electron beam is susceptible to distortion by the earth's magnetic field. The power requirement for a CRT is considerably more than that required for the scanning laser in the present invention.

The device has potential applications from Computer Aided Design (CAD) work stations to cinema screens. Large screen implementation could also involve street displays and highway information displays. High definition television applications of the device are particularly advantageous in situations where conventional liquid crystal displays do not permit high resolution screens of large dimensions.

SUMMARY OF THE INVENTION

Generally speaking, in accordance with the present invention, a display device utilizing a scanning laser to address pixels on a liquid crystal display is constructed, having properties of high resolution and large screen capability with a relatively low cost of manufacturing.

A scanning laser is used to address pixels on a liquid crystal display in which the pixels are composed of photocells arranged in a large two dimensional matrix array. The photocells are mounted on a reflective layer which are then attached to a first transparent panel at the back of the device. This panel sandwiches liquid crystals with a second transparent panel lined with a transparent conductive layer on the inside located at the front of the device. Each pixel or photocell is laser addressed at the back of the device by illuminating, and produces a low voltage at their specific location on the panel to which they are attached. The transparent conductive layer on the inside of the second transparent panel is kept at ground or a different voltage than the photocell thus orienting the liquid crystal layer such that light is polarized across it, as an electric field occurs between the addressed photocells and the second transparent panel. Addition of a polarizing filter to the front of the display device makes these spots or pixels appear black or other colors where the electric field is influencing the liquid crystals, and external light sources can be added at the front to illuminate the device, for this particular embodiment. By varying the laser's intensity of illumination on each pixel, the amount of charge accumulated at the photocell site also varies, thus changing the darkness of each pixel. This produces a grey scale effect on the display screen.

In another embodiment, it is possible to have the device back lit by mounting the photocells on a transparent conductive layer in the assembly previously described as opposed to a reflective layer. When addressed by illuminating, each photocell produces a localized low voltage at the panel. A filter to allow only the passage light of a specific wavelength band identical to the laser's is deposited over each photocell in the two dimensional array. As a photocell is illuminated by the laser, it accumulates a charge where it touches the first transparent panel. This produces a voltage difference across the transparent panels and orients the liquid crystals in such a manner that light is polarized across it. Further effects of a polarizing filter across the front of the display makes these pixels appear black or other colors. An external light source is now used to illuminate the display at the back of the screen. This is accomplished as light from a source travels through a special filter that removes only the specific wavelengths allowed through the photocells' filter and illuminates a transparent conductive layer affixed to each photocell. As individual photocells are addressed, corresponding pixels on the LCD become active when charges are directed to them by the photocells, thus creating a display. When this charge dissipates, the laser would address a new selection of photocells for the next display.

For both embodiments, the photocell stores an electrical charge over a preset duration after which this charge leaks or dissipates. This memory effect keeps the pixel dark (or active) over a predetermined duration, which is a fraction of the time the laser takes to get back to the pixel after scanning the rest of the display producing a grey scale effect.

BRIEF DESCRIPTION OF DRAWINGS

This invention maybe better understood and its numerous objects and advantages will become apparent to those skills in the art by reference to the accompany drawings as follows.

DETAILED DESCRIPTION OF PREFERRED EMBODIMENTS

Figure 1:
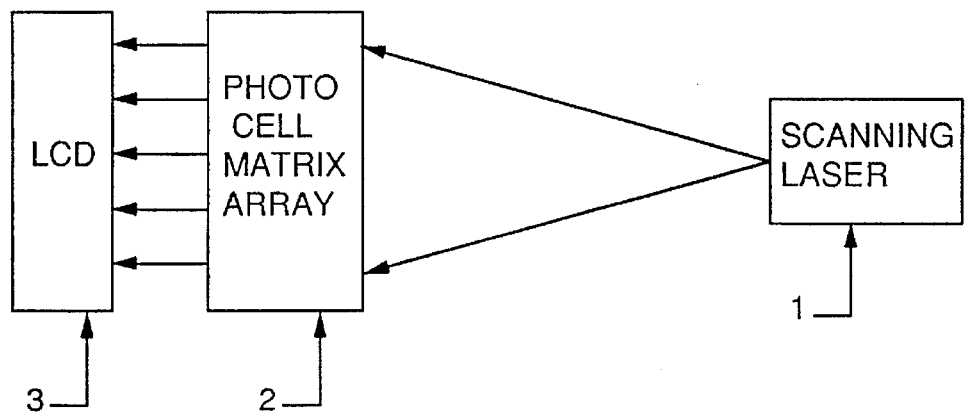
FIG. 1 is a diagrammatic layout of the main components as they are referred to in accordance with the present invention.

For a better understanding of the invention, reference is first made to the block diagram of FIG. 1 which illustrates the three main components of the device as they function to create a display. A scanning laser 1 is used to address and illuminate selected pixels on a photocell matrix array 2. These individually addressed pixels on the photocell matrix array direct a charge to the liquid crystal display (LCD) device 3, which has the same matrix configuration as the photocell array, such that the selected pixels addressed by the scanning laser appear on the LCD.

Figure 2:
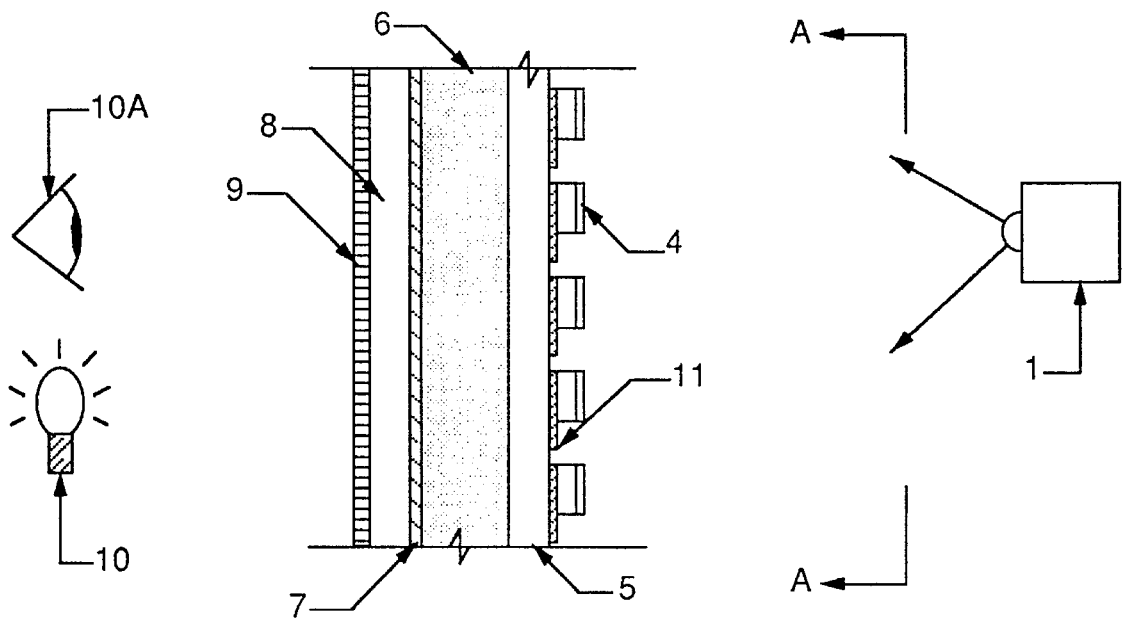
FIG. 2 is an enlarged view of the photocell array addressed by the scanning laser from the rear and illuminated from the front in accordance with the present invention.

Referring now to FIG. 2, which illustrates the composition of the two dimensional photocell matrix array in FIG. 1, the scanning laser 1 addresses and illuminates pixels which collectively compose the desired display. Each of these pixels consists of a photocell 4 which when addressed by illuminating produces a low voltage at the transparent panel 5. The liquid crystals 6 are sandwiched between two transparent panels 8 & 5. The panel 8 also has a conductive transparent layer 7 deposited on its inner surface which could have the option of being patterned depending on the image quality desired. Layer 7 is kept at ground or at a different voltage than that to be achieved for the photocells at the other transparent panel 5. As a photocell 4 is illuminated by the laser, it accumulates a charge where it touches the panel 5. This produces a voltage difference across these pixels on panel 5 and layer 7 and orients the liquid crystal layer 6 in such a manner that light is polarized across it. Further effects of a polarizing filter 9 across the front of the display makes these pixels appear black or another color. An external light source 10 can be implemented to illuminate the display at the front of the display screen where the observer 10A is situated. This is accomplished as light travels through the polarizing filter 9, the transparent panel 8, and the liquid crystal layer 6 after which it is reflected off layer 11 passing back through the liquid crystal layer, transparent panel and polarizing filter directly to the observer 10A. The reflective surface 11 can be an integral part of the photocell 4 or a separate layer deposited on the outer side of panel 5. The photocell 4 could also be deposited on the inner side of panel 5. As individual photocells are addressed, corresponding pixels on the LCD become active when charges are directed to them by the photocells, thus creating a display. When this charge dissipates, the laser would address a new selection of photocells for the next display. The photocells store charges for a preset duration acting as a memory for the device. Variable illumination intensities on the photocell by the laser would result in variable amounts of charge stored producing a variable darkness display or grey scale display for the device.

Figure 3:
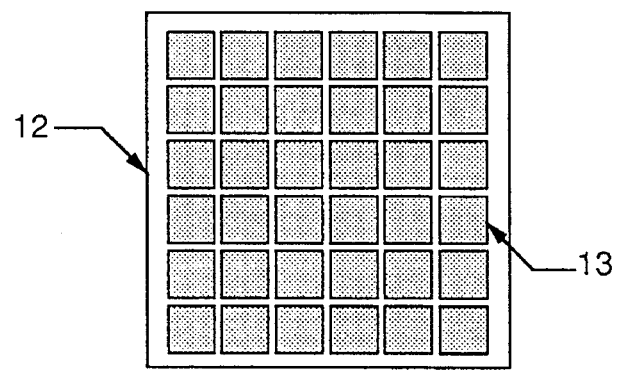
FIG. 3 is an illustration of a matrix array of photocells as seen in view AA of FIG. 2 in accordance with the present invention.

A typical representation of the photocell matrix array as obtained from view AA of FIG. 2 is clearly illustrated in FIG. 3. For example, the entire array 12 is composed of individual photocells or pixels 13 in a two dimensional matrix formation.

Figure 4:
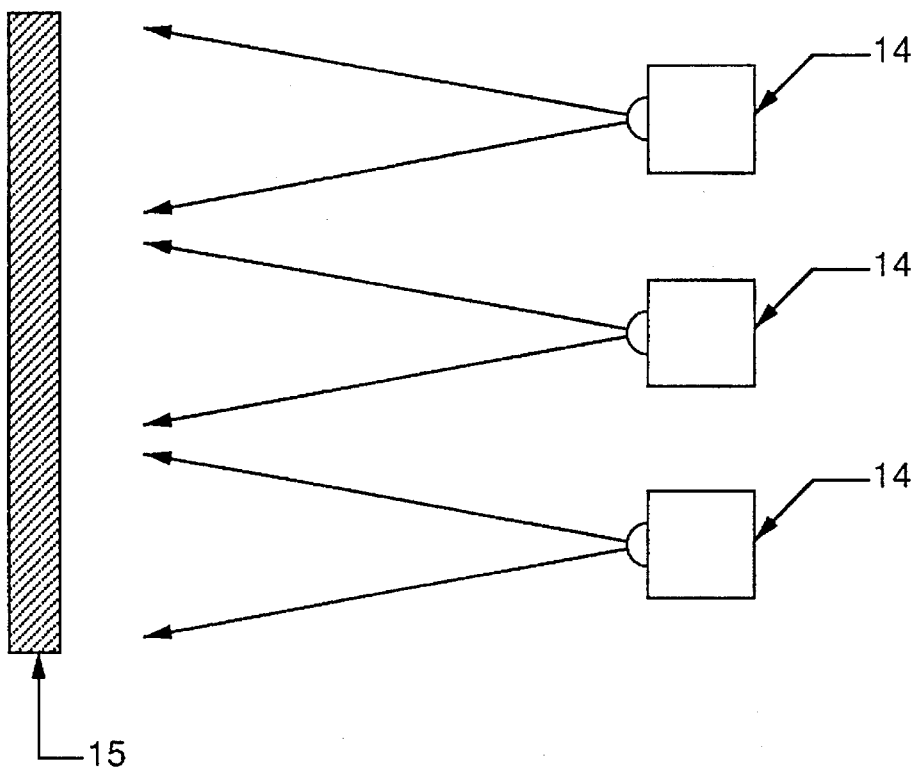
FIG. 4 is a diagrammatic layout of multiple lasers scanning separate portions of the display to speed up the device in accordance with the present invention.

Referring now to FIG. 4, which illustrates the implementation of multiple laser beams 14 to scan separate allotted portions of the display screen 15. This allows more time for the lasers to address each pixel with varying intensity in fast changing displays assisting in contrast control of the displayed image.

Figure 5:
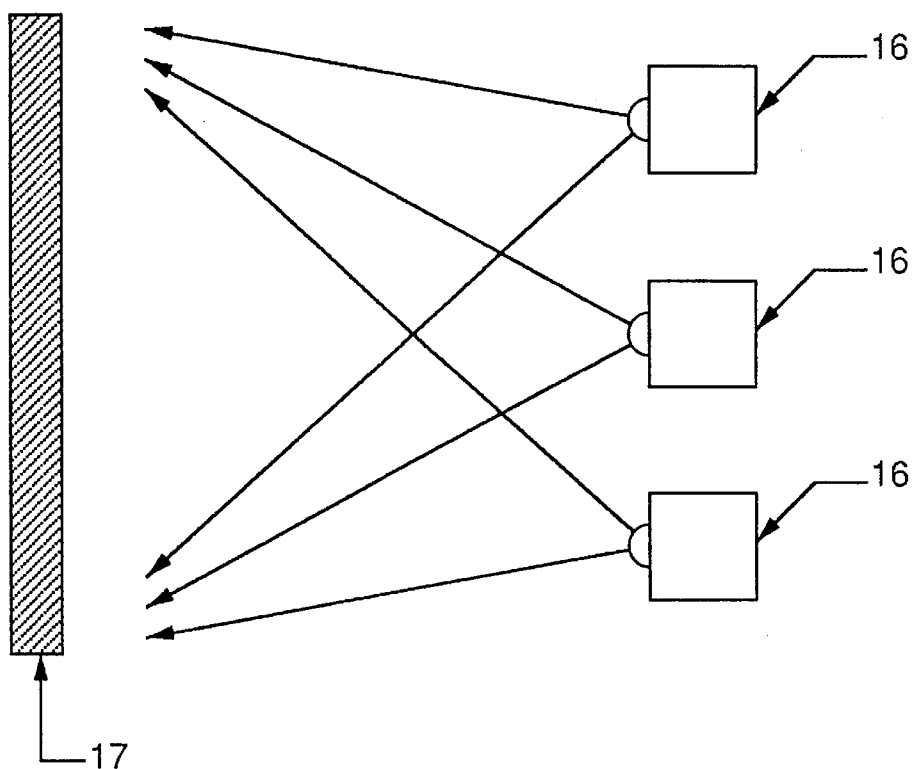
FIG. 5 is a diagrammatic layout of multiple lasers scanning the entire display to speed up the device in accordance with the present invention.

Referring to FIG. 5, which illustrates multiple lasers 16 scanning the entire display screen 17', whereby the lasers overlap in scanned areas to allow more than one laser to address the same pixel if required, yielding a higher contrast than neighboring pixels for an enhanced grey scale display, in this particular embodiment.

Figure 6:
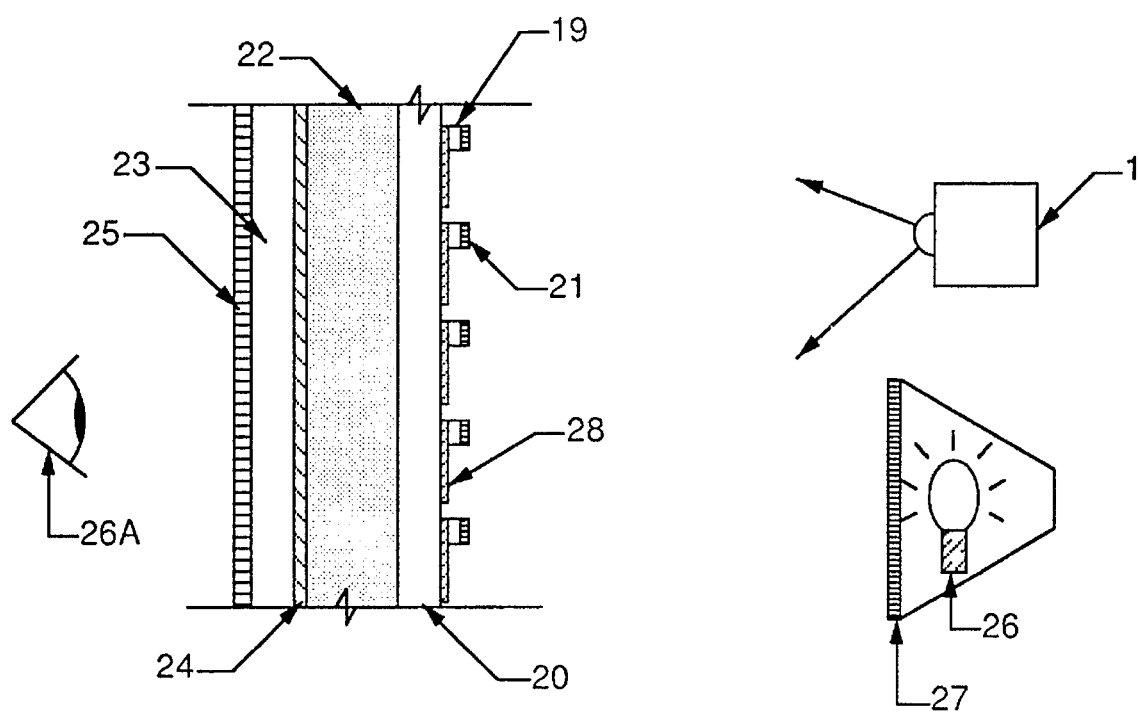
FIG. 6 is a layout similar to FIG. 2 with modifications for illumination at the back in accordance with the present invention.
Figure 7:
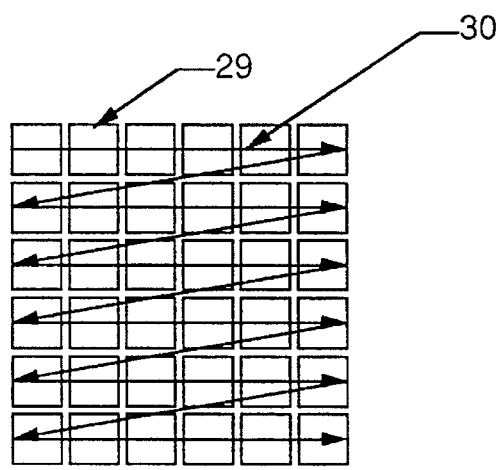
FIG. 7 is a diagrammatic illustration of the laser's scanning sequence of an array of photocells in accordance with the present invention.

Referring now to FIG. 6, which illustrates an alternate composition of the two dimensional photocell matrix array in FIG. 1, the scanning laser 1 of a particular wavelength band addresses and illuminates pixels which collectively compose the desired display. Each of these pixels consists of a photocell 19 which when addressed by illuminating produces a low voltage at the transparent panel 20. A filter 21 to allow the passage light of the laser's wavelength only, is deposited over each photocell in the array. The liquid crystals 22 are sandwiched between two transparent panels 20 & 23. The panel 23 also has a conductive transparent layer 24 deposited on its inner surface which could have the option of being patterned depending on the image quality desired. Layer 24 is kept at ground or at a different voltage than that to be achieved for the photocells at the other panel 20. As a photocell 19 is illuminated by the laser, it accumulates a charge where it touches the panel 20. This produces a voltage difference across these pixels on the panel 20 and layer 24 and orients the liquid crystals 22 in such a manner that light is polarized across it. Further effects of a polarizing filter 25 across the front of the display makes these pixels appear black or another color. An external light source 26 can be implemented to illuminate the display at the back of the display screen with the observer 26A to the front of the display. This is accomplished as light from source 26 travels through a special filter 27 that removes only the laser's wavelength and illuminates the transparent conductive surface 28 which can be an integral part of the photocell 19 or a separate layer deposited on the transparent panel 20. The photocells 19 can also be deposited on the inner side of panel 20 with the transparent layer 28 deposited on the exposed surface of the photocell. As individual photocells are addressed, corresponding pixels on the LCD become active when charges are directed to them by the photocells, thus creating a display. When this charge dissipates, the laser would address a new selection of photocells for the next display Referring to FIG. 7, which illustrates the scanning sequence of the laser for a matrix array of photocells or pixels 29, whereby the laser commences scanning the designated array block at the top left traversing horizontally to the right delivering varied illumination intensities on individual pixels. At the end of each horizontal path, the laser acquires its location on the next row below extreme left, and commences scanning to the right as demonstrated by the traversing path lines 30. When the last pixel in the array is illuminated, the laser is targeted back to the first pixel scanned by which time the charge can no longer be held by addressed photocells. Should any photocell require addressing before the laser has scanned the last in the array, multiple lasers would have to be implemented to speed up the scanning process.

It is also understood that the following claims are intended to cover all of the general and specific features of the invention herein described, and all statements of the scope of the invention which, as a matter of language, might be said to fall therebetween.

I claim:

1. A visual display device comprising:

a first transparent panel which sandwiches a liquid crystal material between itself and a second transparent panel;

a two dimensional array of photocells which are attached to the first transparent panel;

the said second transparent panel coated with a transparent conductive layer which is held at a specific voltage;

a scanning laser which scans the two dimensional array of photocells and illuminates to different degrees specific said photocells;

selected photocells which then translate the illumination energy from the said scanning laser into an electrical charge which accumulates at the photocell site;

the charge accumulated at the photocell site which causes an electric field to occur between itself and the said coating on the second transparent panel;

the electric field which then causes the liquid crystals to polarize light passing through it;

a polarizing filter in front of the second transparent panel polarizes light in a different direction than that done by the liquid crystal under the influence of the electric charge and therefore enables a dark spot to be seen in front of this panel at a location where the electric field is influencing the liquid crystal;

said photocells have a reflective surface on the side that touches the said first transparent panel;

a light source illuminates the front of the display device;

the said light source emits light which passes through the polarizing filter, the second transparent panel, and the liquid crystal material after which it is reflected by the reflective surface of the photocells and then passes back through the liquid crystal layer, the second transparent panel, and the polarizing filter.

2. A device as claimed in claim 1 where the scanning laser illuminates each pixel with separate intensities thus causing variable amounts of charge to be accumulated at each different photocell site.

3. A visual device comprising:

a first transparent panel which sandwiches a liquid crystal material between itself and a second transparent panel;

a back side to the display which is towards the first transparent panel and a front side of the display which is towards the second transparent panel;

the said second transparent panel coated with a transparent conductive layer which is held at specific voltage;

a two dimensional array of photocells which are attached to the first transparent panel;

a filter layer behind each photocell which filters out all electromagnetic radiation other than a first small band of wavelengths;

a scanning laser which emits electromagnetic radiation within the said first band of wavelengths and scans the said two dimensional array of photocells and illuminates to different degrees specific said photocells;

selected photocells which then translate the illumination energy from the said scanning laser into an electrical charge which accumulates at the photocell site;

the charge accumulated at the photocell site which causes an electric field to occur between itself and the said coating on the second transparent panel;

the electric field which then causes the liquid crystals to polarize light passing through it;

a polarizing filter in front of the second transparent panel polarizes light in a different direction than that done by the liquid crystal under the influence of the electric charge and therefore enables a dark spot to be seen in front of this panel at a location where the electric field is influencing the liquid crystal;

a light source which is situated at the back side of the display having properties such that is emits light at all wavelengths accept for the said first band of wavelengths;

the said light emitted by the light source which travels through the first transparent panel, the liquid crystal material, the second transparent panel, and the polarizing filter before it can be seen by a person viewing the visual device.

4. A device as claimed in claim 3 where the scanning laser illuminates each pixel with separate intensities thus causing variable amounts of charge to be accumulated at each different photocell site.

5. A device as claimed in claim 1 or 3 where after the scanning laser illuminates the photocell which accumulates a specific amount of charge, the charge dissipates in a preset duration so that the spot at the location of the photocell remains dark for that preset duration.

6. A device as claimed in claim 1 or 3 where multiple scanning lasers are used to address the photocell array having specific or combined scanning areas illuminating each pixel with separate intensities thus causing variable amounts of charge to be accumulated at each different photocell site.

* * * * *